United States Patent [19]

Gaines, Jr. et al.

[11] 4,427,579
[45] Jan. 24, 1984

[54] METHOD OF PRODUCING FUGITIVE BINDER-CONTAINING NUCLEAR FUEL MATERIAL

[75] Inventors: George L. Gaines, Jr., Scotia; Patricia A. Piacente; William J. Ward, III, both of Schenectady, all of N.Y.; Peter C. Smith, Wilmington, N.C.; Timothy J. Gallivan, Wilmington, N.C.; Harry M. Laska, Wilmington, N.C.

[73] Assignee: General Electric Company, Schenectady, N.Y.

[21] Appl. No.: 331,492

[22] Filed: Dec. 17, 1981

[51] Int. Cl.³ .................... C09K 3/00; G21C 21/00
[52] U.S. Cl. .................... 252/639; 252/637; 252/638; 260/429.1; 264/0.5; 423/9; 423/261
[58] Field of Search ............. 252/625, 637, 638, 639; 260/429.1; 264/0.5; 423/9, 12, 261

[56] References Cited

U.S. PATENT DOCUMENTS 3,966,872 6/1976 Sundar et al. ............. 423/9
3,993,728 11/1976 Schulz ..................... 423/9
4,061,700 12/1977 Gallivan ................. 264/0.5

OTHER PUBLICATIONS

"The Chemical Structure of Some Diamine Carbamates", by Katchalski et al. [J. Amer. Chem. Soc., 73, pp. 1829-1831 (1951)].

Primary Examiner—Leland A. Sebastian
Attorney, Agent, or Firm—Leo I. MaLossi; James C. Davis, Jr.; James Magee

[57] ABSTRACT

A nuclear fuel material green body of density from about 30 to 70% of theoretical density having tensile strenght and plasticity adequate to maintain the integrity of the body during processing leading to ultimate sintered condition is produced by adding an amine carbonate or carbamate or mixture thereof to a particulate mass of the nuclear fuel material under conditions resulting in reaction with the amine compound to form a water-soluble compound effective as a binder for the particulate material.

11 Claims, 1 Drawing Figure

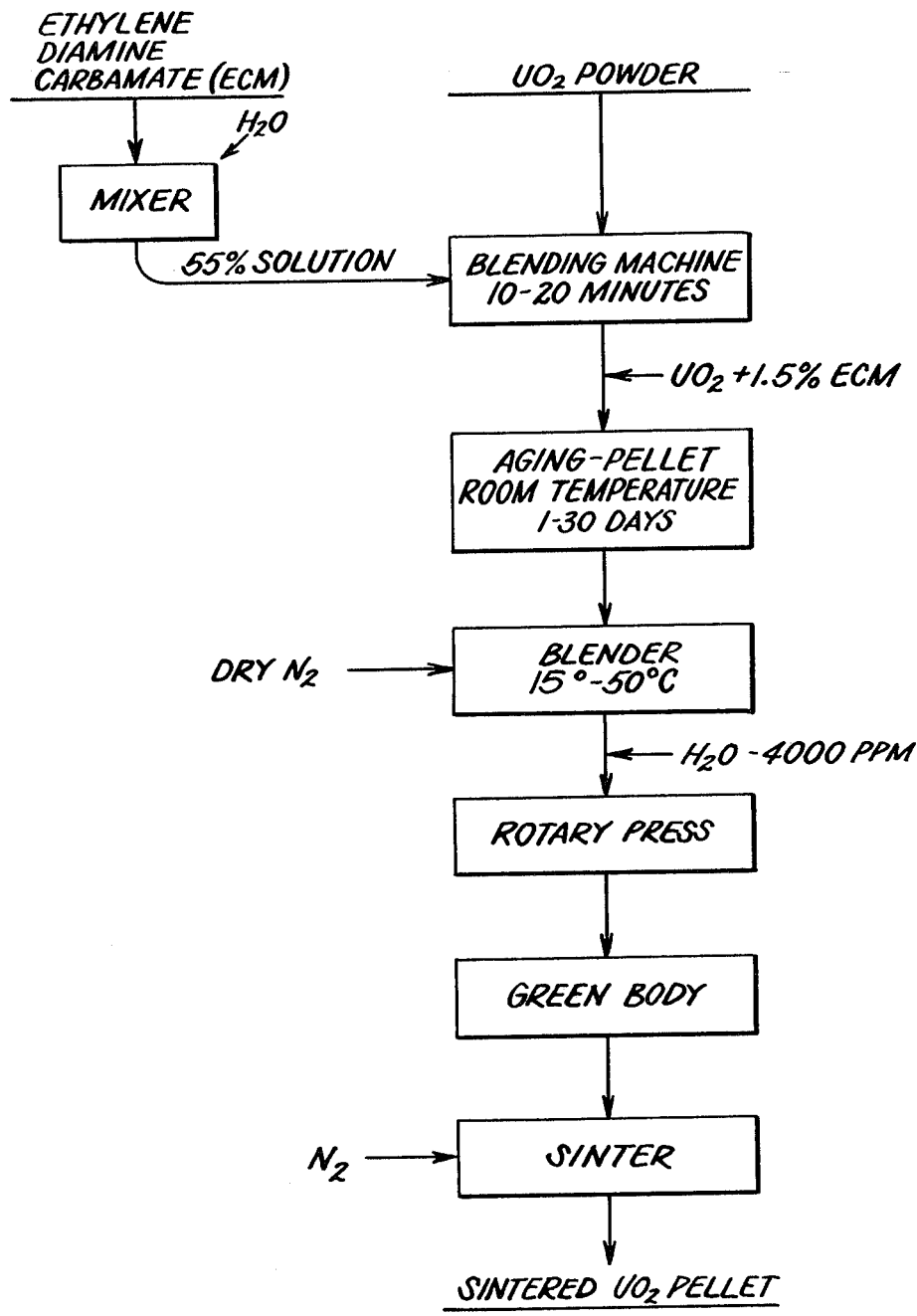

METHOD OF PRODUCING FUGITIVE BINDER-CONTAINING NUCLEAR FUEL MATERIAL

FIELD OF THE INVENTION

The present invention relates generally to the ceramic art and production of sintered bodies of non-metallic powders, and is more particularly concerned with a novel method of producing nuclear fuel powder-binder mixtures which can be compacted to provide green bodies, or compacts, of relatively high tensile strength for the subsequent sintering operation.

CROSS-REFERENCE

This invention is related to that disclosed and claimed in U.S. patent application Ser. No. 273,900, filed June 15, 1981 now U.S. Pat. No. 4,389,341 in the names of George L. Gaines, Jr. and William J. Ward, III and assigned to the assignee hereof, which is based upon the novel concept of adding an amine to nuclear fuel containing ammonium uranyl carbonate, bicarbonate or carbamate under conditions resulting in the formation of a water-soluble uranyl compound which is more advantageous as a binder for the nuclear fuel material in the preparation of compacts than the said ammonium uranyl compound. The Gaines et al. application is incorporated by reference.

BACKGROUND OF THE INVENTION

Various materials are used as nuclear fuels for nuclear reactors including ceramic compounds of uranium, plutonium and thorium with particularly preferred compounds being uranium oxide, plutonium oxide, thorium oxide and mixtures thereof. An especially preferred nuclear fuel for use in nuclear reactors is uranium dioxide.

Uranium dioxide is produced commercially as a fine, fairly porous powder, which cannot be used directly as nuclear fuel. It is not a free-flowing powder, but is one which clumps and agglomerates, making it difficult to pack in reactor tubes to the desired density.

The specific composition of a given commercial uranium dioxide powder may also prevent it from being used directly as a nuclear fuel. Uranium dioxide is an exception to the law of definite proportions since "$UO_2$" actually denotes a single, stable phase that may vary in composition from $UO_{1.7}$ to $UO_{2.25}$. Because thermal conductivity decreases with increasing O/U ratios, uranium dioxide having as low an O/U ratio as possible is preferred. However, since uranium dioxide powder oxidizes easily in air and absorbs moisture readily, the O/U ratio of this powder is significantly in excess of that acceptable for fuel.

A number of methods have been used to make $UO_2$ suitable as nuclear fuel. Presently, the most common method is to die press the powder into cylindrically-shaped green bodies, or compacts, of specific size, which compacts are then sintered.

The various organic or plastic binders that are commonly used for purposes of promoting the production of compacts of powdered materials in preparation for sintering are, however, not useful in application to nuclear fuel because they tend to contaminate the interior of the sintered body with impurities such as hydrides. These binders are normally converted to gases during the sintering step and the gases must be removed requiring special apparatus or procedures. Further, on decomposition, prior art binder materials usually leave deposits of organic substances in the equipment used to sinter the article, complicating maintenance of that equipment. Still further, conventional carbon-base binders would leave a carbon residue in nuclear fuel because they are fired in a reducing atmosphere in which polymeric materials are pyrolyzed.

To a considerable degree, these shortcomings of the prior art have been met and overcome through the invention disclosed and claimed in U.S. Pat. No. 4,061,700, granted to Gallivan on Dec. 6, 1977, and assigned to the assignee hereof. In accordance with that invention, a binder of ammonium uranyl carbonate or corresponding bicarbonate or carbamate is employed to hold the green body or compact together through the handling and processing to the final sintered stage. In more specific terms, green bodies or compacts are produced in accordance with that invention by contacting a particulate mass of $UO_2$, for example, with ammonium bicarbonate and producing thereby a uniform mixture containing about five percent ammonium uranyl carbonate which following compaction is of density of about 30 to 70% of theoretical, but may be as high as 90%, depending upon the pressing force applied in producing the compact. When formed in a conventional batch pressing operation such as that involving an hydrometallurgical press, these green bodies are strong enough to result in relatively high yields of acceptable products. They cannot withstand nearly as well, however, the force conditions involved in continuous production rotary press operations.

The invention of the above-referenced copending patent application Ser. No. 273,900 provides a superior binder which enables the production of nuclear fuel powder compacts of very high tensile strength or an unusual combination of high tensile strength and plasticity which leads to high yields of compact products in rotary press continuous operations. As previously indicated, that invention involves either addition of ammonium carbonate, bicarbonate or carbamate to nuclear fuel particulate material or the synthesis of it, in situ, and reaction thereof with the fuel to form the corresponding ammonium uranyl compound. Thereafter, that process involves bringing an amine compound into contact with the previously formed ammonium uranyl compound under conditions resulting in liberation of ammonia therefrom with apparent formation of an amine compound corresponding to the original ammonium compound, i.e., amine displacement of ammonia.

SUMMARY OF THE INVENTION

We have found that the new results and advantages of the invention of the above-referenced copending patent application can be obtained without either providing an ammonium uranyl compound in the nuclear fuel material or carrying out an ammonia-liberating reaction involving that material. Moreover, this can be accomplished without incurring any significant offsetting disadvantage or processing complexity. In fact, we have found that a satisfactory compact can be made by a method which involves even fewer steps than that of aforesaid referenced patent application.

In essence, our invention centers in the concept of adding an amine carbonate or amine carbamate to particulate nuclear fuel under conditions such that there is a reaction resulting in the formation of a water-soluble uranyl compound which is effective as a binder in the preparation of a compact of the nuclear fuel material. Preferably, the amine compound is ethylene diamine carbamate, but in any event, it is added either as a solid or as a concentrated aqueous solution and mixed with the fuel powder so that it is substantially uniformly distributed throughout the particulate material.

The density of the resulting compact will routinely vary from 30 to 70% of theoretical density, but may have an even higher value.

We have found that conditions favoring the reaction to form the amine uranyl compound are standard conditions including room temperature (about 68–72° F.) and atmospheric pressure, although sometimes moderate heating may be desirable. Water or a source of water in the form of a higher than normal humidity is necessary to carrying out this reaction effectively to completion and is conveniently provided in the form of the solvent phase of a solution of the amine carbonate or carbamate added to the fuel. Alternatively, water may be added as bulk water, i.e., liquid, or as vapor.

In general, in its method aspect, this invention includes as a key step adding from about 0.5% to about 7% by weight of an amine carbonate or carbamate (or mixture thereof) to particulate nuclear fuel. The resulting mixture is aged to form a water-soluble uranyl derivative of the added amine compound which is of superior effect as a binder for the fuel material, which is then pressed to form a compact of nuclear fuel pellet size and shape for ultimate sintering. Preferably, the additional step involves bringing the amine compound in liquid or solid form into contact with the nuclear fuel particulate so that it is substantially uniformly distributed.

Likewise stated in general terms, in its composition of matter aspect, the nuclear fuel particulate material of this invention contains a minor proportion of amine carbonate or amine carbamate or both.

DETAILED DESCRIPTION OF THE INVENTION

As shown on the accompanying drawing, which is a flow sheet diagram illustrating the method of this invention, it is our preferred practice to prepare a mixture of $UO_2$ powder containing ethylene diamine carbamate by blending a 55% aqueous solution (i.e. 45% $H_2O$ by weight) of the latter with $UO_2$ powder in the proportion of about 1.5% by weight of the carbamate relative to the $UO_2$. With blending accomplished in a suitable machine in 10 to 20 minutes, the substantially uniform resulting mixture containing of the order to 15,000 parts per million water is aged at room temperature in a closed vessel long enough for the amine compound to react with the $UO_2$ to form a water soluble uranyl compound effective to bind the particulate mixture together on pressing. Several minutes to one day is normally sufficient for this purpose depending on the blend technique used, but the aging period may be prolonged as desired to 30 days or more without detrimental effect upon the ultimate green body compact or the sintered pellet product.

Before forming compacts of the aged particulate mixture, it is dried to water content of about 4,000 parts per million by exposure to a stream of dry nitrogen (dew point about −40° C.) in a fluidized bed blender at a temperature between 15° C. and 50° C. The compacting step preferably then involves a rotary press which is operated continuously in the usual manner as the available aged particulate mixture is used to exhaustion. As the final step of the process, the green body compacts are heated suitably in the usual manner and with the standard equipment presently in general use in the production of sintered $UO_2$ pellet products.

While multifunctional primary amine carbamates and carbonates are preferred in accordance with our practice of this invention and are used singly, it will be understood that other amine carbonates and carbamates may be used and that mixtures of them are suitable for the purpose. Likewise, it will be understood that while ethylene diamine carbamate is favored, others of the class may, in some cases, be preferable because of commercial availability or for other practical reasons. Among those specially suited as alternatives at the present time are the carbonates and carbamates of monomethylamine, 1,3 propanediamine, 1,6 diaminohexane, and 1,7 diaminoheptane. In most of these cases, the operator has the choice of the form in which the amine compound is used.

Those skilled in the art will also understand that the new advantages and results of this invention may be consistently obtained through operations which constitute other departures from the preferred practice or best mode described immediately above. Thus, for instance, the amine compound employed may be added to and blended with the $UO_2$ powder in solid rather than in liquid or aqueous solution form, the essential requirement being that the mixture be substantially uniform however it is produced. Further, the compaction step may be carried out batchwise and by means of an hydraulic press or other suitable device. Again, the aging step and the drying step may be carried out for times and at temperatures yielding the desired effects, although they constitute comparatively sizable variations. The operator, accordingly, has relatively wide latitude of choice in regard to these aspects of the present novel process.

The novel features and advantages of this invention will be further evident from the following illustrative but not limiting examples (in which concentrations are expressed in percent by weight) of our actual practice of the invention:

EXAMPLE I

Ethylene diamine carbamate was prepared in a laboratory experiment by variant of the procedure of Katchalsky, et al., J. American Chemical Society, 73, 1829 (1951). A solution of 14 grams reagent grade ethylene diamine and 60 ml anhydrous methyl alcohol was cooled in ice, and $CO_2$ gas was bubbled into it for one-half hour. The precipitate which formed was filtered off, washed with ether and dried in vacuum to yield 22.0 grams of the carbamate. A mixture of $UO_2$ powder and 6% of the carbamate and 0.5% $H_2O$ was without aging compacted to produce pellets which proved to have tensile strength of 50 psi and significant plasticity.

EXAMPLE II

In another test involving carbamate produced as described in EXAMPLE I, the same mixture was prepared but in this case was aged for 14 days before being pressed to form pellets. The resulting green bodies had tensile strength of 58 psi and significant plasticity.

EXAMPLE III

Again, carrying out the EXAMPLE II experiment, except for drying the mixture over dessicant before pressing, resulted in pellets having tensile strength of 105 psi and significant plasticity.

EXAMPLE IV

Using 3% carbamate but maintaining it under humid conditions for 17 days and then drying the mixture over dessicant resulted in green bodies having tensile strength of 145 psi and significant plasticity.

EXAMPLE V

In another experiment repeating the procedure of EXAMPLE IV, except that the mixture was not dried, resulted in unusable pellets.

EXAMPLE VI

Again, using a mixture as described in EXAMPLE IV, except that liquid water was added and well dispersed. This mixture was aged for 12 days in a sealed container before drying over dessicant. The resulting pellets had a tensile strength of 135 psi and significant plasticity.

EXAMPLE VII

Using 5% of a saturated aqueous solution of the ethylene diamine carbamate prepared as described in EXAMPLE I, aging for 12 days and then drying the $UO_2$ mixture over a dessicant resulted in compacts having tensile strength of 160 psi and significant plasticity.

EXAMPLE VIII

Using the material prepared as described in EXAMPLE I in proportion of 3% of the carbamate and 0.5% moisture, but either without aging and/or drying resulted in compacts of tensile strength approximating 50 psi and essentially no plasticity.

It will be understood by the term "nuclear fuel materials" as used herein and in the appended claims, we mean and intend those materials as defined in the aforesaid Gallivan patent, which is incorporated by reference, this invention process being equally applicable to those materials independently and in an admixture. Thus, there should be a uranium content, or the equivalent, adequate to produce on aging, as described above, a water soluble compound which has marked effect in providing the binding necessary to produce compacts which will withstand the usual handling during production to yield a high proportion of useful sintered pellet product.

Throughout this specification and the claims, wherever percentages or proportions are designated, reference is to the weight basis unless otherwise expressly stated.

We claim:

1. In the method of producing a sintered body of nuclear fuel material including the steps of pressing a particulate nuclear fuel material to form a green body compact and thereafter sintering the compact, the improvement of adding at least one amine compound selected from the group consisting of amine carbonates and amine carbamates to the particulate nuclear fuel material and reacting the resulting mixture in the presence of $H_2O$ prior to the pressing step.

2. The process of claim 1 in which the at least one amine compound is a carbonate or a carbamate of amine selected from the group consisting of 1,3 diaminopropane, 1,6 diaminohexane, 1,7 diaminoheptane, monomethylamine and ethylene diamine and mixtures thereof.

3. The method of claim 1 in which the at least one amine compound is ethylene diamine carbamate and in which the said carbamate is added as an aqueous solution to the particulate nuclear fuel material and substantially uniformly distributed throughout the said material.

4. The method of claim 3 in which the ethylene diamine carbamate is added in the form of a saturated aqueous solution and mixed with the particulate nuclear fuel material, and in which the resulting mixture is then dried at room temperature to promote reaction of the carbamate with the nuclear fuel material to form the corresponding water-soluble derivative compound.

5. A composition of matter soluble in water produced by the reaction in the presence of water between an oxide of uranium and at least one amine compound selected from the group consisting of amine carbonates, amine carbamates and mixtures thereof.

6. The composition of matter of claim 5 in combination with nuclear fuel particulate material, said composition of matter being on the surface of said particulate material and the amine compound used being present from about 0.5% to about 7% by weight of said nuclear fuel particulate material.

7. The composition of matter of claim 5 in which the at least one amine compound is ethylene diamine carbamate.

8. The method of producing a sintered body of nuclear fuel material comprising the steps of adding to particulate nuclear fuel material at least one amine compound selected from the group consisting of amine carbonates, amine carbamates and mixtures thereof; reacting said at least one amine compound with uranium dioxide of the nuclear fuel material in the presence of $H_2O$ to form a water-soluble amine uranyl compound; pressing the resulting mixture to form a green body compact, and firing said green body compact to produce said sintered body.

9. The method of claim 8 in which amine compound is added in the amount between about 0.5% and about 7% by weight of the nuclear fuel particulate material.

10. The method of claim 9 in which the amine compound is ethylene diamine carbamate.

11. The method of claim 8 in which the at least one amine compound is ethylene diamine carbamate and in which the mixture of nuclear fuel material and amine compound initially contains about 4% by weight water.

* * * * *